Figure 1:
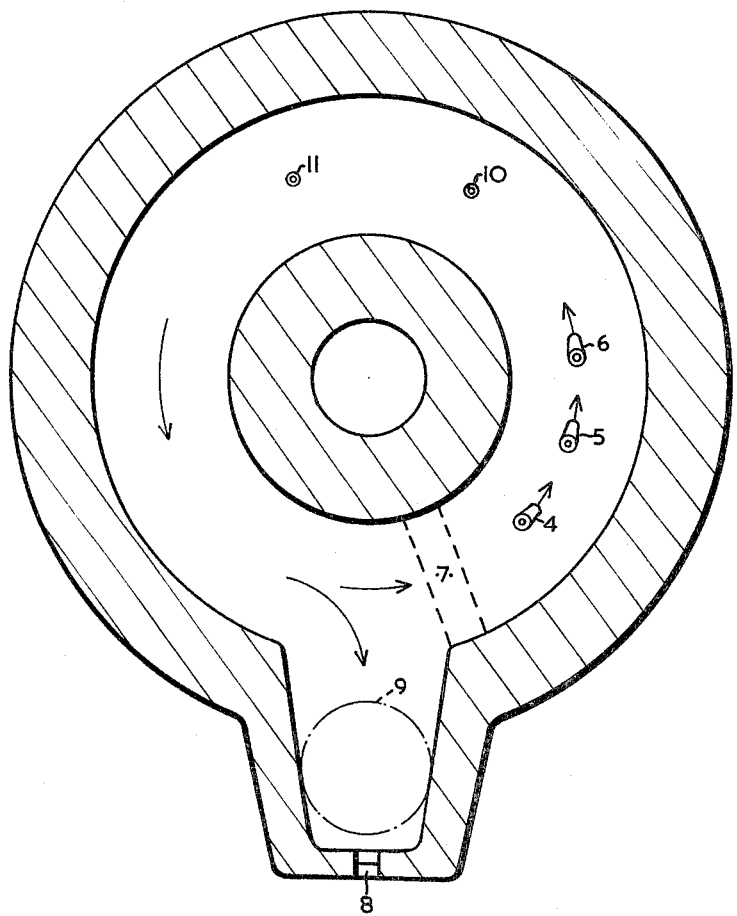

Nov. 29, 1966 H. K. WORNER 3,288,451
CONTINUOUS PRODUCTION OF FURNACE PRODUCTS
Filed Feb. 19, 1964 4 Sheets-Sheet 1

Howard Knox Worner
Inventor

By Wenderoth, Lind & Ponack
Attorneys

Nov. 29, 1966 H. K. WORNER 3,288,451
CONTINUOUS PRODUCTION OF FURNACE PRODUCTS
Filed Feb. 19, 1964 4 Sheets-Sheet 3

United States Patent Office 3,288,451
Patented Nov. 29, 1966

3,288,451
CONTINUOUS PRODUCTION OF
FURNACE PRODUCTS
Howard K. Worner, New Lambton, New South Wales, Australia, assignor to Farnsfield Limited, Nassau, Bahamas, a corporation of the Bahamas
Filed Feb. 19, 1964, Ser. No. 345,987
Claims priority, application Australia, Feb. 21, 1963, 27,676/63; Apr. 11, 1963, 29,505/63
7 Claims. (Cl. 263—40)

This invention relates generally to the continuous production of furnace products such as molten silicates including slag and glass from appropriate particulate raw materials.

The invention relates to the production of molten silicates such as slag for the manufacture of slag wool, "foamglass," granulated slag, slag bricks and the like or glass for the manufacture of glass wool, glass bottles, glass bricks, and the like.

An object of the invention is to make possible the continuous production of molten silicates from cheap particulate materials such as silica sand, lime sand or lime dusts, clays, soda ash and such other particulate materials as may be cheaply and readily available and appropriate to the composition of the slag or glass required.

Another object of the invention is to achieve the melting of the ingredients in a simple and cheaply constructed furnace, with high thermal efficiency and without the use of costly regenerators.

Another object of the invention is to make possible the production of an easily controlled stream of slag or glass at a constant temperature, suitable for feeding into equipment for manufacture of fibres, "foamglass" etc.

The invention in its various forms utilises a furnace in which there are three regions or zones, which, however, are not necessarily distinguished by being separated by walls or baffles. These zones may be described as follows:

(i) A feed zone in which the bath is kept turbulent or vigorously stirred by the jetting action and by reactions between an oxygen-containing gas and a carbonaceous fuel.
(ii) A somewhat quiescent zone where further heat is generated by the burning of any fuel or combustible gases leaving the turbulent feed zone.
(iii) A completely quiescent zone from which the molten silicate is tapped.

In one general form the invention is a method of producing molten materials from particulate raw materials comprising the steps of preparing a pre-melted stream from a mixture of such raw materials or the product of a previous melt in a furnace, feeding into or onto the stream in a limited length or zone of the furnace supplies of a mixture of such materials with carbonaceous fuel, introducing an oxygen containing gas into the furnace in close association with the second mixture, maintaining around at least part of the furnace a substantially one-way flow of the stream and tapping portion of the stream continuously from a quiescent region.

In another general form the invention is a method of producing molten materials from particulate raw materials comprising the steps of preparing a pre-melted stream from a mixture of such raw materials or the product of a previous melt in an annular furnace, feeding into or onto the stream in a limited length or zone of the annulus supplies of a mixture of such materials with carbonaceous fuel, introducing an oxygen-containing gas into the furnace in close association with the second mixture, maintaining around the furnace a substantially one-way flow of the stream, tapping portion of the stream continuously from a quiescent region and allowing the remaining portion of the stream to recycle into the feed zone.

In another general form the invention is equipment for carrying out the first method comprising a furnace having an approximately circular portion and in elongated extension therefrom, means for feeding selected raw materials with carbonaceous fuel into the circular portion and into or onto a pre-melted stream of a mixture of such raw materials or the product of a previous melt, and for maintaining around the circular portion a substantially one-way flow of the stream, means for introducing an oxygen-containing gas into the furnace in association with the feed, means for tapping continuously portion of the stream from the extension near its end remote from the circular portion and means for discharging furnace gases in proximity to the region from which the stream is tapped.

In another general form the invention is equipment for carrying out the second method comprising an annular furnace, means for feeding selected materials with carbonaceous fuel and an oxygen-containing gas into or onto a pre-melted stream of such materials or the product of a previous melt in the furnace, means for maintaining a one-way flow of the stream around the furnace, means for substantially preventing a mass reverse flow of gases in the furnace above the stream, means for discharging continuously from the furnace portion of the stream and allowing the remainder of the stream to recycle into the feed zone and means for discharging furnace gases near to the point of discharge of portion of the stream.

In another general form the invention is a method of producing molten materials from particulate raw materials comprising the steps of preparing a pre-melted stream from a mixture of such raw materials or the product of a previous melt in a furnace, feeding into or onto the stream in a limted length or zone of the furnace supplies of a mixture of such materials with carbonaceous fuel, introducing an oxygen containing gas into the furnace in close association with the second mixture and also at other appropriate positions so as to enable the burning of any fuel or combustible gases unburnt in the feed zone, maintaining around at least part of the furnace a substantially one-way flow of the stream and tapping portion of the stream continuously from a quiescent region.

In another general form the invention is a method of producing molten materials from particulate raw materials comprising the steps of preparing a pre-melted stream from a mixture of such raw materials or the product of a previous "melt" in an annular furnace, feeding into or onto the stream in a limited length or zone of the annulus supplies of a mixture of such materials with carbonaceous fuel, introducing an oxygen-containing gas into the furnace in close association with the second mixture, introducing in another zone after the feed zone further oxygen-containing gas so as to ensure substantially complete combustion of any fuel or combustible gases unburnt in the feed zone, maintaining around the furnace a substantially one-way flow of the stream, tapping portion of the stream continuously from a quiescent region and allowing the remaining portion of the stream to recycle into the feed zone.

In another general form the invention is equipment for carrying out the third method comprising a furnace having an approximately circular portion and an elongated extension therefrom, means for feeding selected raw materials with carbonaceous fuel into the circular portion and into or onto a pre-melted stream of a mixture of such raw materials or the product of a previous melt, and for maintaining around the circular portion a substantially one-way flow of the stream, means for introducing an oxygen containing gas into the furnace, both in association with the feed and separately from it, means for tapping continuously portion of the stream from the extension near its end remote from the circular portion, and means for discharging furnace gases in proximity to the region from which the stream is tapped.

In another general form the invention is equipment for carrying out the fourth method comprising an annular furnace, means for feeding selected materials with carbonaceous fuel and an oxygen containing gas into or onto a pre-melted stream of such materials or the product of a previous melt in the furnace, means for maintaining one-way flow of the stream around the furnace, means for substantially preventing a mass reverse flow of gases in the furnace above the stream, means for discharging continuously from the furnace portion of the stream and allowing the remainder of the stream to recycle into the feed zone, and means for discharging furnace gases near to the point of discharge of portion of the stream.

In this specification particulate material is taken to refer to solids whose individual particles are fine enough to be handled in tubes pneumatically or by gravity flow. In most cases the particles would have a maximum size of one centimetre.

An annular furnace means one providing one or more continuous circuits for fluid flow but with one or more outlets and/or inlets. It includes those shown in the attached drawings in FIGURES 1 to 4, but is not restricted to such forms.

The invention makes use of modern techniques for dispensing and injecting powders along with air or air enriched with oxygen.

The fuel used may be liquid or gaseous such as oil, natural gas or gas made from coal, but where a coal is available of low ash content or whose mineral matter is appropriate to the composition of the slag or glass being manufactured, this can be used advantageously in a comminuted form, as for example, after hammer milling. Cheap fines from the drying and briquetting of brown coal may form a suitable fuel.

The particulate materials may be simply and cheaply handled on belts or pneumatically in tubes or gravitationally and injected into the furnace through ports or lances which may or may not be fluid cooled.

The term "lance" where used throughout this specification is intended to include a tube, having one or more discharge outlets through which gaseous or liquid fuel, oxygen, air or air enriched with oxygen is injected into the furnace.

For the feed to the melting zone, multi-tube lances are convenient, one or more tubes carrying the non-carbonaceous particulate materials entrained in an oxygen containing gas and one or more carrying the fuel with or without air or nitrogen or returned furnace gases.

It is advantageous to dry and preheat the particulate reactants. Some of the waste gases from the melting operation may be used for this purpose. The oxygen-containing gas may also be preheated by heat exchange from the exit gases.

The furnace in which the melting and refining operations are carried out may be lined with a refractory appropriate to the materials being charged and manufactured. High grade, dense alumina-rich bricks, or zircon bricks or rammed alumina or zircon or carbon bricks are among the refractories which may be used.

Alternatively the side walls of the furnace may be constructed, in whole or in part, of water jackets.

The invention differs from other methods of manufacture of slag or glass inasmuch as the particulate components, including any solid fuel, are preferably jetted onto or into a slowly and continuously flowing stream or portion of the already melted slag or glass which has been allowed to re-enter the melting zone of the furnace.

By injecting the particulate materials onto or into the liquid silicate stream, dusting is minimised as is also abrasion of the walls and roof of the furnace. The particles of sand, lime, soda ash or other component quickly become wetted by and are absorbed into the hot liquid silicate stream.

Figure 6:
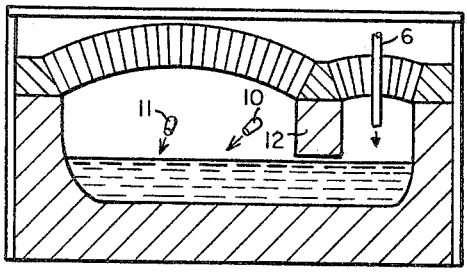
Figure 2:
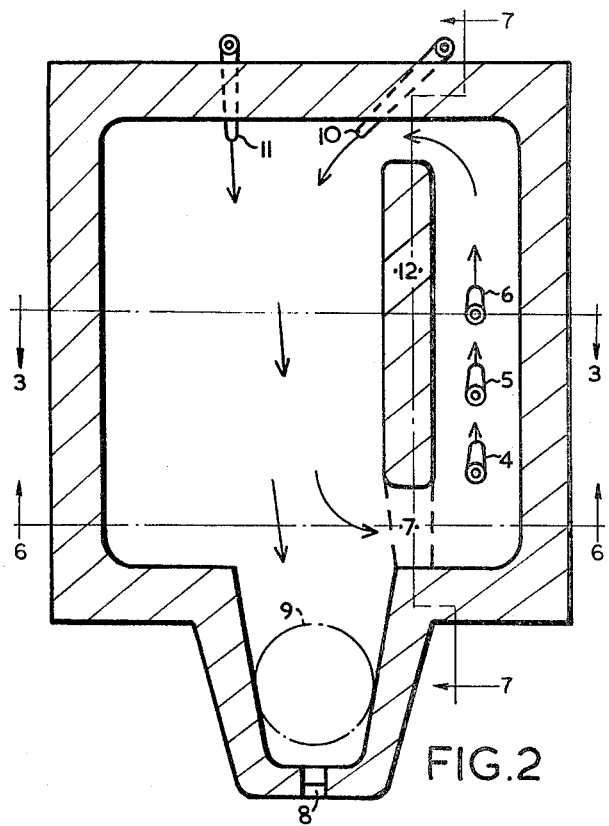
Figure 3:
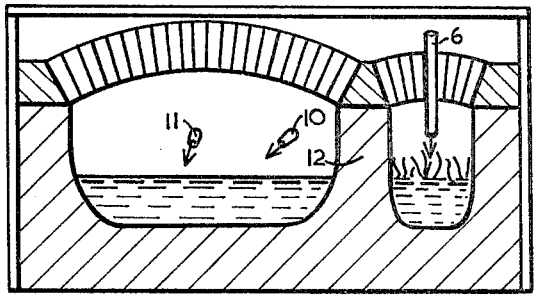
Figure 4:
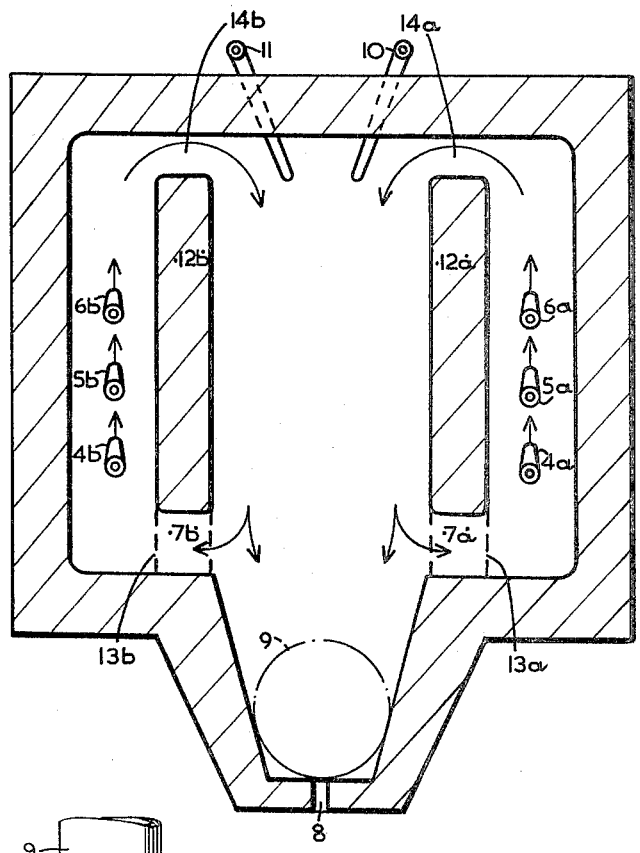
Figure 7:
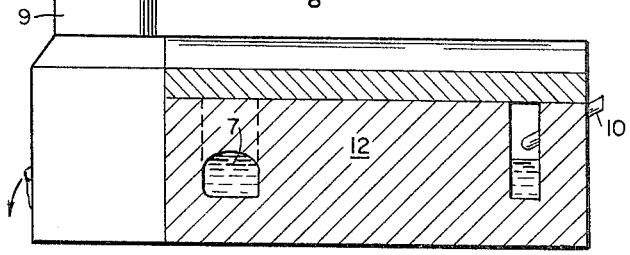
Figure 5:
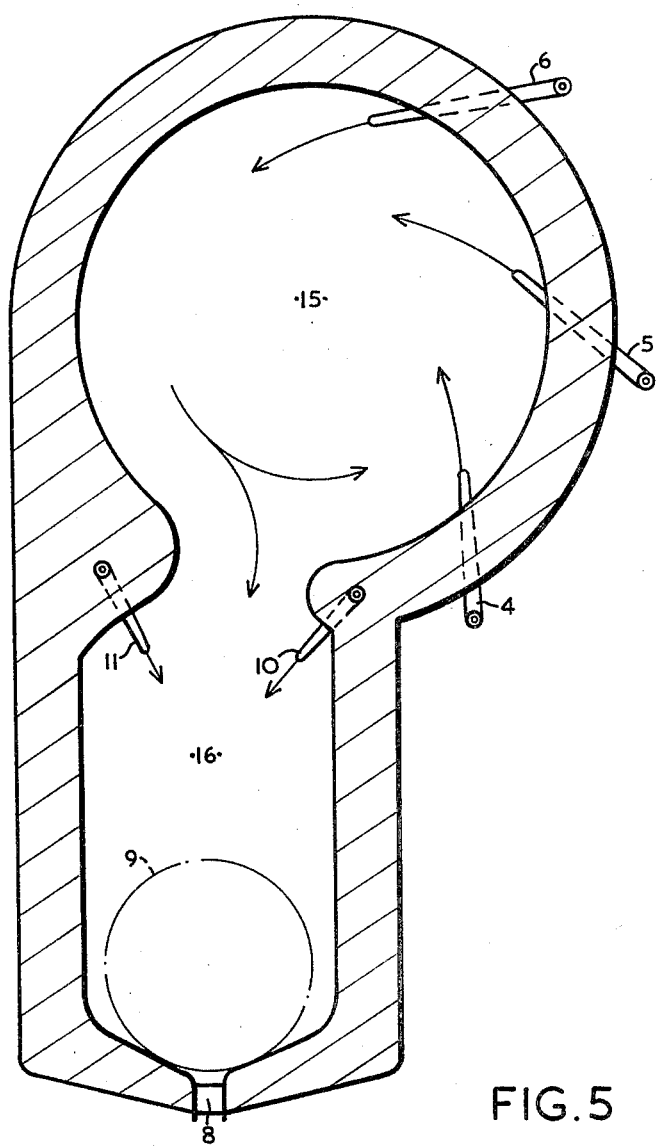

Some forms of the invention are shown in the drawings in which:

FIGURE 1 is a plan view of one form of furnace;
FIGURE 2 is a plan view of a modified furnace;
FIGURE 3 is a section on the line 3—3 of FIGURE 2;
FIGURE 4 is a plan view of a further modified furnace;
FIGURE 5 is a plan view of a further modified furnace;
FIGURE 6 is a sectional view taken along 6—6 of FIG. 2; and
FIGURE 7 is a sectional view taken on 7—7 of FIG. 2.

In one form the furnace is in the form of an annulus trough as shown diagrammatically in FIGURE 1. Provision is made for feeding or injecting the particulate ingredients into one section of the furnace. A tap hole is provided to take off the molten silicate at another portion and an outlet for the hot gases is also provided near the tap hole.

The particulate components, preferably heated and pre-blended with carbonaceous fuel are injected pneumatically through ports or lances at positions such as 4, 5 and 6 onto or just under the surface of that portion of the slowly flowing silicate stream which has been allowed to recycle under a refractory gas barrier 7 into the melting zone of the furnace.

The barrier extends upwards to the furnace roof and downwards to near the liquid surface in the furnace.

In the melting zone, as soon as the gaseous components from the lance strike the liquid silicates, the fuel component reacts vigorously with the oxygen of the air or air enriched with oxygen, quickly raising the temperature of the particulate materials to the point where they burn or are readily absorbed into the molten silicate bath.

The silicate bath and hot gases flow concurrently around the annulus, the heat reverberating from the roof and being transmitted also by direct contact between the gases and the molten bath.

Usually not all of the fuel is completely burned in the turbulent feed zone and, in any case, some unburnt carbon monoxide will almost certainly exist in the gases leaving the feed zone. These combustible materials are caused to burn in the remaining zones by injecting oxygen-containing gas through ports or jets at positions such as 10 and 11. It is desirable that oxygen-containing gas be blown into the furnace through jets which cause turbulence in the gases. This greatly assists in the combustion of the carbon monoxide content of the hot gases.

The fully burnt gases then flow concurrently with the molten slag or glass to the gas offtake 9 which is situated near to the taphole 8.

The molten slag or glass is tapped continuously through one or more tap holes at some appropriate position such as 8 while the hot gases are taken off through an off-take 9, in the roof or side walls of the furnace at some position as close as possible to the actual tap hole or tap holes. By this means the maximum opportunity is allowed for heat transfer from the hot gases to the slowly flowing stream of molten silicate.

If desired a "scum" barrier may be located on the upstream side of the outlet tap hole. This prevents scum or floating dross from flowing out with the liquid slag or glass. The scum barrier may not be necessary if a bottom or submerged tap hole is employed.

It will be recalled that portion of the silicate stream re-cycles into the melting zone under the gas barrier 7. The proportion of re-cycled material is not critical and can be adjusted by altering the silicate outflow rate relative to the rate of injection of the particulate components.

In starting up the furnace, only fuel and air or air enriched with oxygen are injected through fuel burners or the ports or lances 4, 5, 6. Heating of the portion of the furnace remote from the main inlet ports or lances is achieved by radiation and convection from the hot gases as they pass around the annulus towards the outlet 9. It is usually desirable in the start up period to have additional fuel burners at such positions as 10 and 11. Once the refractory brick lining has reached a temperature approaching the slag or glass melting point, some slag or glass, as the case may be, from a previous run is charged in lump form through side doors (not shown) or is injected in particulate form with a little extra fuel through the ports or lances 4, 5, 6. The slag or glass progressively melts and builds up in height in the furnace until the level is slightly higher than that of the bottom of the tap hole. At this stage the tap hole plug is removed and the slag or glass allowed to flow out to pass to the next stage of manufacture. In the meantime, the injection of the particulate charge components will have been stabilised at a rate appropriate to the production rate desired.

To ensure that the flow of molten silicate is maintained in the appropriate direction (anti-clockwise in the example shown) one or more of the feed ports or lances is tilted at an appropriate angle to give a forward movement to the liquid underneath its jet.

The general shape of the furnace shown in FIGURE 1 is convenient provided suitable brick shapes are available and means are provided for supporting or suspending the arched annulus roof. The furnace may however be of other general shape to suit the type and shape of bricks available and the roof construction preferred. Thus the outline may be oval, D shaped, square or rectangular so long as the furnace trough or launder in each case is so designed as to permit recycling of a portion of the molten silicate stream.

Thus in FIGURE 2 is shown diagrammatically (in outline) a rectangular form of the invention. The numerals have the same connotations as in FIGURE 1.

From FIGURE 3 it will be seen that, in this form of the invention, there is considerably greater gas space above the liquid on the left hand side of the internal wall 12 than on the right or feed zone side. This has the effect of slowing down the gas flow after the gases leave the feed zone; this in turn has the beneficial effects of (i) Allowing entrained particulate solids or molten droplets to fall into the bath
(ii) Making it easier to combust unburnt carbon monoxide which has been swept around from the feed zone.

As has been mentioned before, any oxygen-containing gas introduced at positions such as 10 and 11 is appropriately blown in through jets which give turbulent motion to the gases and this greatly assists the combustion of the carbon monoxide.

In FIGURE 4 is shown diagrammatically in plan another form of the invention. This has a furnace incorporating two "zones" where the particulate materials may be injected. Thus injection may take place through ports or lances 4a, 5a, 6a, either simultaneously with or alternately with ports or lances 4b, 5b, 6b. By using the latter procedure it is possible to shut down and effect repairs to one feed zone of the furnace while the other is still operating.

If, for the purpose of fettling or for other purpose, it is desired to shut down and isolate one of the feed zones, refractory barriers can conveniently be lowered through removable portions of the roof of the furnace at positions 13a and 14a or 13b and 14b as the case may be.

In the arrangement of FIGURE 5, there is no annulus. The melting zone 15 is more or less circular in plan with an extension towards the refining or fining zone 16. If desired, an "initiator" liquid may be fed into the furnace at any convenient inlet in the walls or roof. Some or all of the main feed ports or lances carrying the particulate reactants are arranged, as shown at 4, 5 and 6 so as to give an approximately tangential motion to the bath liquid or liquids. In this way more or less circulatory flow is induced, such as is produced by the annular furnaces of FIGURES 1 to 4.

9 is the hot gas outlet.

In all forms of the invention the mechanics of feeding or injecting the particulate materials can be one or other of several techniques which have recently been evolved for use in either the steel or glass making industries. Likewise the fuel burners used for preheating the furnace and for keeping the tap hole region hot can be one of the several burner designs currently in use in the steel, non-ferrous metal or glass industries.

It should be understood that while in FIGURES 1 and 2 three ports or lance positions are shown and in FIGURE 4 six ports or lance positions are shown, the number of injection points and the size and type of injector may be varied to suit the size of the furnace and the production rate desired. Furthermore, the ports for the lances may be either in the roof or through the outside walls as may be preferred to suit the general furnace and lance designs and the amount and type of particulate materials being injected.

The sensible heat in the exit gases from each form of the invention may be used for a number of purposes, such as drying and preheating the particulate charge materials, including coal if it be used, preheating the air or oxygen-enriched air and for steam raising for use in other sections of the plant or for power generation.

In order to drain the furnace at the end of a campaign, a drain plug can be provided at a convenient point. Alternatively the whole furnace may be designed to permit slight tilting towards the tap hole.

The following examples illustrate the invention.

*Example 1*

A small annulus furnace of the type shown in FIGURE 1 lined with dense alumina brick was heated with oil burners and progressively charged with crushed slag until a liquid bath about 4″ deep was accumulated and at a temperature of about 1350° C. The approximate analysis of the slag was

|         | Percent |
|---------|---------|
| $SiO_2$ | 38 |
| CaO | 35 |
| $Al_2O_3$ | 18 |
| MgO | 4.5 |
| $Na_2O$ | 1.5 |
| $K_2O$ | 2.0 |
| Other | 1.0 |

Into this bath in the feed zone of the furnace was jetted a mixture of equal parts of finely crushed blast furnace slag, of a composition similar to that given above, and finely ground bituminous coal. Both the slag and coal were 100% minus 32 mesh. The mixture was entrained in warm air and jetted into the bath through one lance while commercially pure oxygen of 99.5% purity was jetted through a nearby lance. The heat generated by the reactions between the coal and oxygen as the materials entered the hot furnace chamber and particularly when the pulverent coal penetrated the frothing bath were sufficient to keep the bath fully molten. After jetting had continued for approximately 10 minutes a steady state condition was achieved in the furnace with a flow around the annulus as desired. The temperature was maintained between 1300 and 1350° C. whilst slag was tapped off through the slag tap hole and a composition somewhat similar to that collected above, except that the alumina content was a little higher, probably due to the incorporation of high alumina ash from the burning fuel and a little alumina from the furnace lining. Such slag is considered suitable for slag wool manufacture.

*Example 2*

The annulus furnace was charged with broken bottles and heated with an oxy-propane flame until the glass was fully molten at about 1250° C. Into this molten glass was jetted a mixture as follows:

| | Parts |
|---|---|
| Fine silica sand | 20 |
| Fine burnt lime | 10 |
| Fine crushed soda glass | 20 |
| Dry brown coal fines | 50 |

The first three components were preheated to a dull red heat (about 550° C.) and jetted in hot air through a heat resistant steel pipe while in an adjoining water cooled lance the oxygen and coal fines were jetted.

The heat generated by the rapid oxidation of the brown coal fines was sufficient to keep the bath fully molten and sufficient momentum was given to cause a flow of liquid around the annulus.

In this case, as with Example 1, relatively little dusting occurred; the hot particles of feed materials seemed to become rapidly wetted by the turbulent and somewhat frothy silicate bath. Some of the brown coal, however, floated on the liquid leaving the feed zone but was progressively burnt away in the adjoining region of the annulus as more hot air was blown through turbulent jets into this zone, as described in the body of the specification.

After two hours operation, a sample of the glass being tapped was taken and the following approximate analysis obtained:

| | Percent |
|---|---|
| $SiO_2$ | 65 |
| CaO | 10.5 |
| $Al_2O_3$ | 14.2 |
| $Na_2O$ | 8.0 |

There were a few fine bubbles in the glass as tapped. These are inherent in small scale operations but would be eliminated by adequate residence time in the fining zone of a large production furnace.

What is claimed is:

1. An apparatus for producing molten materials from particulate raw materials, comprising a housing having therein an elongated chamber in a closed figure, said chamber being divided into a feed and melting portion and a fining portion, said portions being distinct and the fining portion having a greater volume than the feed and melting portion, at least one material conduit means extending through said housing into said feed and melting portion and directing the particulate material at an angle to the horizontal and in the direction of elongation of the feed and melting portion of said chamber to move molten material in a flowing stream through the elongated chamber, particulate material feed means coupled to said material conduit means for feeding particulate material and a fluid through said material conduit means, at least one oxygen containing gas feeding means in said fining portion, said housing having a molten material tapping means at the downstream end of said fining portion and having an exhaust gas flue at the downstream end of said fining portion.

2. An apparatus for producing molten materials as claimed in claim 1 and further comprising a gas barrier between the downstream end of said fining portion and the upstream end of said feeding and melting zone.

3. An apparatus as claimed in claim 1 in which there are a plurality of material feed conduit means in said feeding and melting portion each at an angle to the horizontal and in the direction of elongation of the feed and melting portion, only one of said conduit means having the particulate material feed means connected to it and at least one of the other conduit means having fuel feed means connected to it.

4. An apparatus as claimed in claim 1 in which said material conduit means and said oxygen containing gas feeding means are lances.

5. An apparatus as claimed in claim 1 in which said housing has a substantially rectangular chamber therein with a partition extending across the chamber spaced at a lesser distance from one side wall of the chamber than from the other and having the ends thereof spaced from the end walls of the chamber to define chamber portions connected to each other around the ends of the portion to form the elongated chamber, the feed and melting portion being between the partition and the one side wall of the chamber and the fining portion being between the partition and the other side wall, said gas feeding means for said fining portion extending through the end wall of the housing at the upstream end of the fining portion.

6. An apparatus as claimed in claim 1 in which said housing has a substantially annular chamber therein, the feed and melting portion extending about one fourth of the distance around the annulus and having a plurality of material conduit means extending into it, and said fining portion extending the remaining distance around the annulus and having a plurality of oxygen containing gas feeding means therein at the upstream end of said fining portion.

7. An apparatus for producing molten materials from particulate raw material, comprising a housing having a substantially rectangular chamber therein with two substantially parallel partitions extending across the chamber and spaced from the side walls of the chamber a distance less than they are spaced from each other and each having the ends thereof spaced from the end walls of the chamber, a feed and melting portion being defined between the partitions and the side walls of the chamber and a fining portion being defined between the partitions, the volume of the fining portion being greater than the volume of either of the feed and melting portions, at least one material conduit means extending through said housing into each of said feed and melting portions and directing the particulate material at an angle to the horizontal and in the direction of elongation of the feed and melting portions of said chamber to move molten material in a flowing stream through the elongated chamber portions, particulate material feed means coupled to said particulate material conduit means for feeding particulate material and a fluid through said material conduit means, at least one oxygen containing gas feeding means extending through the housing into said fining portion at the upstream end thereof, said housing having a molten material tapping means at the downstream end of said fining portion and having an exhaust gas flue at the downstream end of said fining portion.

References Cited by the Examiner

UNITED STATES PATENTS

| 2,161,181 | 6/1939 | Marx | 266—33 X |
| 2,451,582 | 10/1948 | Smith | 263—40 |
| 2,603,476 | 7/1952 | Whiston | 266—33 |
| 2,689,433 | 9/1954 | Mathews | 266—33 X |
| 2,872,175 | 2/1959 | Guenzi | 263—8 |

FREDERICK L. MATTESON, JR., *Primary Examiner.*

JOHN J. CAMBY, *Examiner.*

D. A. TAMBURRO, *Assistant Examiner.*